United States Patent [19]

Thomas et al.

[11] Patent Number: 4,689,490
[45] Date of Patent: Aug. 25, 1987

[54] INSTALLATION FOR THE ATUOMATIC READING OF INFORMATIONS ON MOVED OBJECTS

[75] Inventors: Franz Thomas; Thomas Ruppert; Karl F. Warmulla, all of Karlsruhe, Fed. Rep. of Germany

[73] Assignee: Gebhardt Foerdertechnik GmbH, Fed. Rep. of Germany

[21] Appl. No.: 720,731

[22] Filed: Apr. 8, 1985

[30] Foreign Application Priority Data

Apr. 7, 1984 [DE] Fed. Rep. of Germany ....... 3413288

[51] Int. Cl.⁴ .............................................. G06K 7/10
[52] U.S. Cl. ..................................... 250/566; 235/462
[58] Field of Search ................... 250/223 R, 566, 568, 250/225, 453.1; 235/454, 470, 462; 382/65

[56] References Cited

U.S. PATENT DOCUMENTS 4,500,776 2/1985 Laser .............................. 235/454 X

FOREIGN PATENT DOCUMENTS 2315504 10/1973 Fed. Rep. of Germany .
3204021 8/1983 Fed. Rep. of Germany .

*Primary Examiner*—Eugene R. Laroche
*Assistant Examiner*—Robert J. Pascal

[57] ABSTRACT

An installation for the automatic reading of information applied on a code carrier on movable objects, especially on piece goods, by means of an image converter connected to an evaluation system; the code carrier arranged on the object is thereby moved through the pick-up field of the image converter in any desired angular- and width-position as well as, within a limited area of any desired height- and inclination-position; a linear semiconductor sensor with a large number of photoelements is provided as image converter in a narrow line-shaped pick-up field extending transversely to the movement direction of the object while the code carrier has an optically active coating.

12 Claims, 4 Drawing Figures

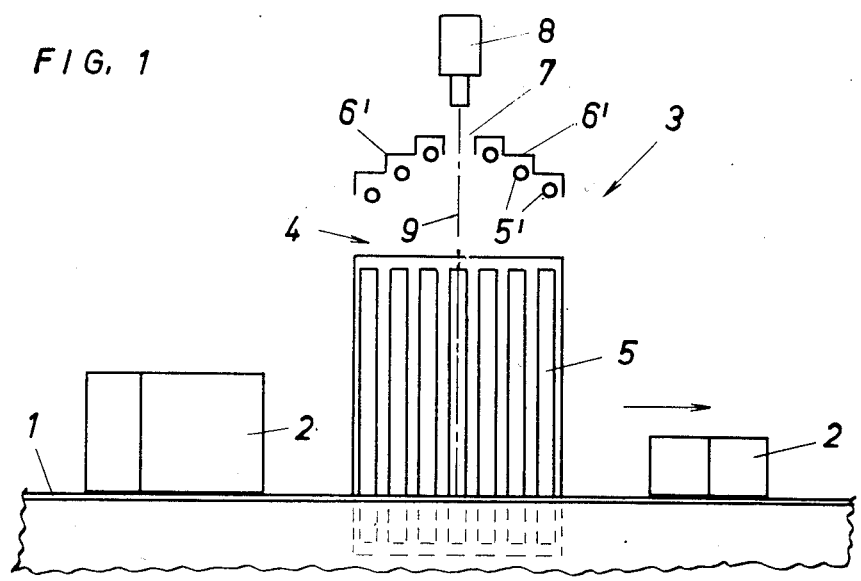
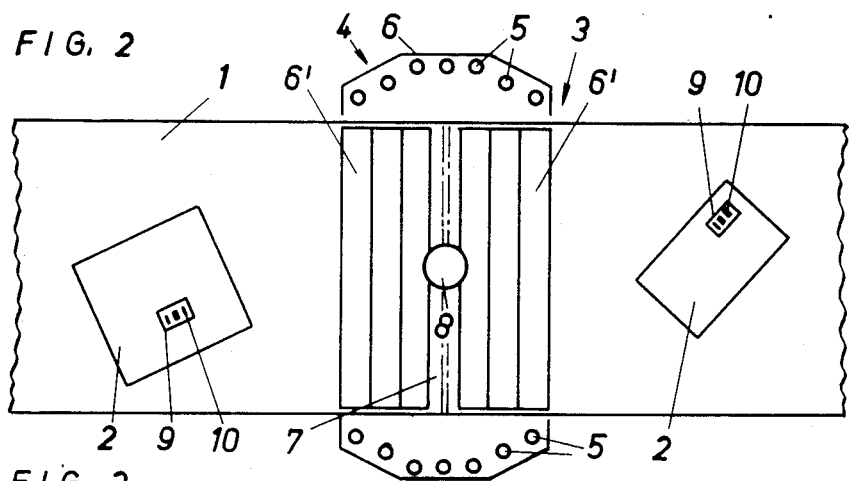
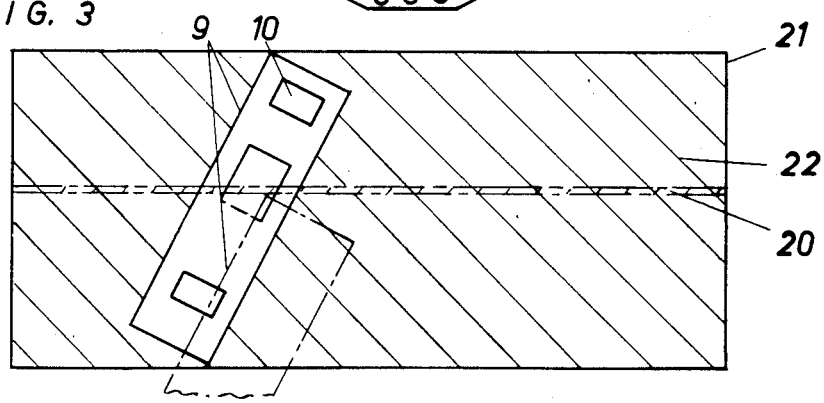

INSTALLATION FOR THE ATUOMATIC READING OF INFORMATIONS ON MOVED OBJECTS

BACKGROUND AND SUMMARY OF THE INVENTION

The present invention relates to an intallation for the automatic reading of informations applied to a code carrier on moved objects, especially piece goods, by means of an image converter connected to an evaluation system, through the pick-up field of which the code carrier arranged on the object is moved in any desired angular- and width-position as well as within a limited area of any desired height- and inclination-position.

A distribution installation for moved piece goods is described already in the DE-OS No. 32 04 021, in which a pick-up camera constructed as a video camera is provided. For searching and evaluating the information which moves through the pick-up field of the pick-up camera in any desired angular- and width-position as well as within a limited area of any desired height- and inclination-position, the entire pick-up field extending over the width of the conveyance means and a certain length area must always be scanned. A large number of data must be evaluated thereby which lie outside of the information, i.e., are negative. The computer is thus loaded by a large number of nonrelevant signals, whence the evaluation and recognition speed suffers. The latter is additionally impaired by the fact that a stationary picture has to be taken for the evaluation, i.e., the object must either be stopped for a short period of time or the pick-up camera must be pivoted synchronously with the moving object. As a result thereof, the installation becomes costly and maintenance-intensive.

Accordingly, it is the object of the present invention to improve an installation of the type described hereinabove in such a manner that a high evaluation speed and high evaluation accuracy are attained in a simple manner.

The underlying problems are solved according to the present invention in that a linear semiconductor sensor with a large number of photoelements is provided in a narrow line-shaped pick-up field extending transversely to the movement direction of the object and in that the code carrier has an optically active coating.

The advantages obtained with the present invention reside in particular in that by the construction of the image converter as a linear semiconductor sensor and by the line-shaped construction of the pick-up field connected therewith, only a small area must be detected in each case whereas the pick-up of the information in the longitudinal direction takes place by the inherent movement of the object, i.e., by the movement of the object itself. Furthermore, a high contrast effect is attained by the construction of the code carrier with an optically active coating. As a result thereof, the evaluation in length and width can be limited to the field of the code carrier, and more particularly independent of its respective position. Thus, essentially only data relevant for the information reach the computer. By reason of the image data achieved in this manner, a high recognition and evaluation velocity is achieved so that the objects to be controlled, for example, the piece goods, can pass through the evaluation field with a high velocity. The installation according to the present invention is thus capable to fulfill the requirements for omnidirectional recognition of informations, for practically any desired configuration of the objects, i.e., for example, nonhomogeneous piece goods, and for a high object velocity.

These and other objects, features and advantages of the present invention will become more apparent from the following description when taken in conjunction with the accompanying drawing, which shows, for purposes of illustration only, one embodiment in accordance with the present invention, and wherein:

BRIEF DESCRIPTION OF THE DRAWINGS

FIG. 1 is a schematic side view of an installation according to the present invention;

FIG. 2 is a schematic plan view on the installation of FIG. 1;

FIG. 3 is a schematic illustration of the pick-up area of the installation in accordance with the present invention.

DETAILED DESCRIPTION OF THE DRAWINGS

Figure 4:
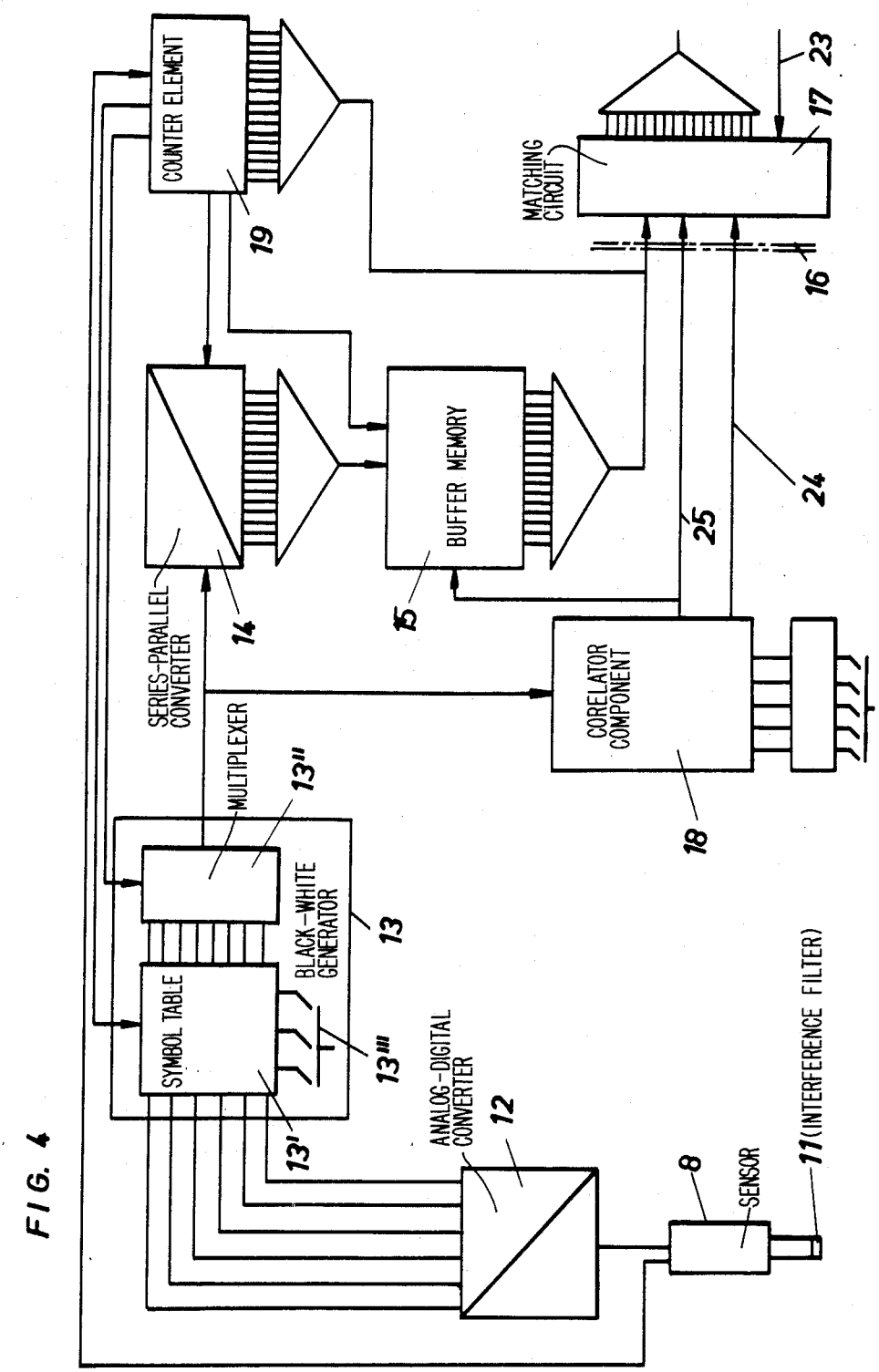
FIG. 4 is a block diagram of the image-processing unit.

Referring now to the drawing wherein like reference numerals are used throughout the various views to designate like parts, the present invention will be explained by reference to a conveyor system for the distribution of piece goods, in order to conduct the piece goods after automatic recognition to a predetermined destination. Of course, the present invention is not limited to this application but can be used in any other application where a code carrier is recognized and is subjected to a predetermined treatment as a consequence of this automatic recognition of the information. A conveyor band 1 or the like is illustrated in FIGS. 1 and 2, on which objects indicated as piece goods 2 are transported. The piece good 2 itself may be constructed in any desired manner, for example, as a packed or non-packed object of any configuration, such as a carton, sack, bag or the like. A reading station generally designated by reference numeral 3 is arranged at a suitable place along the conveyor band 1. The reading station 3 includes a lighting installation generally designated by reference numeral 4, by means of which an area of the conveyor band 1 serving as recognition field is illuminated uniformly. For this purpose, several fluorescent tubes 5 are arranged on both sides vertically and above the same several fluorescent tubes 5' are arranged horizontally. Reflectors 6 and 6' mounted behind, respectively, above the fluorescent tubes 5 and 5' serve for the further uniform light distribution. The reflectors 6 and 6' may be constructed as parabolic reflectors or, as illustrated, as polygon reflectors.

A slot-like opening 7 is provided in the center between the horizontal fluorescent tubes 5', respectively, the reflectors 6' thereof transversely to the conveyor band 1; an optical, linear semiconductor sensor 8 is arranged centrally above the slot-like opening 7 as image converter which detects the pick-up field on the conveyor band 1, respectively, the information contained therein, through the opening 7 with the aid of an objective. A code carrier 9 with an information 10 is affixed onto each piece good 2 at the top thereof, i.e., on the surface facing the semiconductor sensor 8. The code carrier 9 includes an optically active coating, for example, of a fluorescent material, and can be affixed either directly onto the piece good 2 or can be constructed as a label and secured on the piece good 2. The information 10 is printed, respectively, sprayed in any desired configuration, either coded or noncoded, in contrast color and in any conventional manner on the code carrier 9, i.e., on the optically active, for example, fluorescent coating. The fluorescent tubes 5 and 5' are matched to the characteristic spectral region of the optically active coating so as to cause excitation of the optically active coating as the piece goods move through the illuminated pick-up field.

The image converter is constructed as linear semiconductor sensor 8 with, for example, 1024 photoelements (Pixel) whereby an interference line filter 11 is connected in front of the objective thereof (FIG. 4). The interference line filter 11 is so constructed and designed that only the radiation emitted by the optically active coating of the code carrier 9 having a narrow band width of the spectral range is transmitted. It is assured therewith that only the emission radiation of the coating of the code carrier 9 is transmitted to the semiconductor sensor 8 and contrast problems are far-reachingly eliminated because the background and, in particular, the radiation of the lighting installation 4 are thereby masked out.

According to FIG. 4, an analog-digital converter 12, a black-white-generator 13, a series-parallel converter 14 and a buffer memory 15 are series-connected to the output of the semiconductor sensor 8. The buffer memory 15 is operatively connected by way of an interface 16 with a matching circuit 17 and with a computer (not shown). Additionally, a correlator component 18 is provided which is connected to the output of the black-white-generator 13 and which is also operatively connected with the buffer memory 15 and with the matching circuit 17. Furthermore, a counter-element 19 is provided which is directly coupled with the semiconductor sensor 8, with the buffer memory 15 and with the matching circuit 17.

If a piece good 2 is conducted on the conveyor band 1 through the lighting installation 4, then it must also pass the line-shaped pick-up field 20 extending transversely to the conveyor band 1, which is indicated in FIG. 3 in dash-and-dotted lines. As soon as the most forward corner or edge of the code carrier 9 indicated in dash-and-dotted lines which is arranged on the piece good 2 in any desired angular- and width-position as well as, within a wide range, also in any height- and inclined-position, the latter at least up to 45°, enters the pick-up field 20, the first white pictures are transmitted by the emitting label radiation. These white pictures are recognized by the correlator component 18 and serve as start signal which activates the series-connected computer for data transmission. Since only the emission radiation of the code carrier 9 can pass the interference line filter 11, also only the area of the code carrier 9 is transmitted. The width of the pick-up field 20 is matched, for example, to the width of the conveyor band 1 and amounts, for example, to 500 mm. or 32 computer words whereas the length of the pick-up area 21 covered by the pick-up field 20 in the transport direction of the piece good 2 has a fixed line number which is matched to the maximum length, for example, in the diagonal direction, of the code carrier 9 and may amount, for example, to 150 lines. Furthermore, only the brightness levels "white" and "black" are transmitted so that a binary image results. As a result thereof, a complex and costly search for the code carrier 9 within the pick-up area 21 is avoided and the number of the data to be processed is reduced to a minimum number.

The signals thus produced in the semiconductor sensor 8 are digitalized in the series-connected analog-digital converter 12 and a 6-bit binary word is coordinated to each image point, so that maximally 64 gray levels can be produced. The sensitivity of the digitalizing threshold can be adjusted with the aid of a potentiometer in the analog-digital converter 12. The thus-digitalized analog values are now conducted to a symbol table 13' of the black-white generator 13 in which the digital values are classified in headings or columns "black" or "white." The threshold can be adjusted by an external switch 13' which is responsible for the coordination in one of the two columns or headings. For example, digital values of the order of magnitude larger than or equal to the value 59 are coordinated to the binary value one=white. In contrast thereto, the digital values which are smaller than the value 59 are graded as zero=black. A multiplexer 13" series-connected with the table 13' combines the thus-determined data into serial binary signals. The coordination table 13' and the multiplexer 13" together form the black-white generator 13 in which is established a binary image of the code carrier 9 and of the information 10 formed from the values zero and one.

The serial binary signals are converted as image data in the series-parallel converter 14 into parallel, for example, 16-bit words and are so transmitted to the buffer memory 15 which serves as buffer. The further transmission of these binary signals to the computer is controlled by the correlator component 18 which determines the starting point of the data transmission. The data transmission begins as soon as a signal for the activation of the matching circuit 17 is received by the computer by way of a line 23 (FIG. 4) and a synchronizing signal is transmitted from the correlator component 18 by way of a line 24 to the matching circuit 17. The synchronizing signal occurs again when digital values with "white" are supplied by the black-white generator 13, which means that the semiconductor sensor 8 has detected the code carrier 9.

The transmission of the data from the correlator component 18 and the matching circuit 17 are further monitored by an acknowledgment line 25. The counter element 19 counts during the data transmission those digital values which possess a sufficient white component. As a result thereof, the series-connected evaluation time of the bit sample is shortened because the angular position of the code carrier 9 is rapidly recognized. The stop signal for the data transmission takes place from the computer. The defined data transmission which is obtained by the aforementioned measures signifies a data reduction and thus enables a rapid data-processing. Since the components represented by the blocks in the block diagram and their operation are known in the art, a detailed description thereof is dispensed with herein for the sake of simplicity.

The recognition system is to be considered as an overall system in which the different components such as illumination, optically active coating, interference line filter and semiconductor sensor are matched to one another. The physical effect of the frequency displacement by the radiation emission of shorter wavelength of the light tubes and the conversion of the radiation into a spectral range of longer wavelength within the optically active coating of the code carrier 9 is utilized in order to eliminate contrast problems and thus to process only image data relevant to the information.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the automatic reading of information contained in a code carrier means on moved objects, comprising image converter means having a pick-up field, evaluation means operatively connected with the image converter means, the code carrier means being moved through the pick-up field of the image converter means, the image converter means including a linear semiconductor sensor means having a large number of photoelements within a relatively narrow, substantially line-shaped pick-up field extending transversely to the movement direction of the object, and the code carrier means having an optically active coating, further comprising an interference line filter means connected to the input of the semiconductor sensor means, the interference line filter means transmitting to the semiconductor sensor means only the radiation emitted by the optically active coating of the code carrier means and thus permitting passage only of the characteristic component of the spectral distribution.

2. An installation according to claim 1, wherein said sensor means includes optical means, and said interference line filter means is connected ahead of the optical means, between the optical means and the moved object.

3. An installation according to claim 1, further comprising lighting means for lighting the pick-up field including fluorescent tubes arranged on both sides and above the pick-up field, reflectors coordinated to the fluorescent tubes for the uniform light distribution, said fluorescent tubes being designed for the excitation of the optically active coating of the code carrier means and being matched to the characteristic spectral range of the optically active coating.

4. An installation according to claim 3, wherein the optically active coating of the code carrier means is affixed on a label.

5. An installation according to claim 3, wherein the optically active coating of the code carrier means is affixed directly to the object.

6. An installation according to claim 3, wherein an analog-digital converter means is connected to the output of the semiconductor sensor means, a black-white generator means is connected to the output of the analog-digital converter means, and a switch means is provided on the generator means for adjusting the threshold between "black" and "white."

7. An installation according to claim 6, wherein a series-parallel converter means is connected to the black-white generator means and a buffer memory means is connected to the series-parallel converter means, and a correlator means is operatively associated with the buffer memory means for the fetching of temporarily stored data, said correlator means being constructed as electronic coupling element which recognizes only the relevant image data and transmits the same to the series-connected computer from the buffer memory means.

8. An installation according to claim 7, further comprising a counter means for counting the image lines having a sufficient white proportion.

9. An installation according to claim 8, wherein the width of the pick-up field amounts to about 1024 photoelements.

10. An installation according to claim 8, wherein the width of the pick-up field amounts to about 500 mm.

11. An installation according to claim 8, wherein the length of the pick-up area covered in the transport direction of the object by the pick-up field is matched to the maximum length of the code carrier means.

12. An installation according to claim 11, wherein the length of the pick-up area amounts to about 150 lines.

* * * * *

UNITED STATES PATENT AND TRADEMARK OFFICE
CERTIFICATE OF CORRECTION

PATENT NO. : 4,689,490

DATED : August 25, 1987

INVENTOR(S) : Thomas et al.

It is certified that error appears in the above-identified patent and that said Letters Patent is hereby corrected as shown below:

Change the first line of item [75] page 1 of the patent to read:

-- [75] Frank Thomas; Thomas Rummert; Karl --

Signed and Sealed this

Twenty-ninth Day of March, 1988

Attest:

DONALD J. QUIGG

Attesting Officer      Commissioner of Patents and Trademarks